(12) United States Patent
Sayers

(10) Patent No.: US 7,679,993 B2
(45) Date of Patent: Mar. 16, 2010

(54) METHOD OF CHARACTERIZING A FRACTURED RESERVOIR USING SEISMIC REFLECTION AMPLITUDES

(75) Inventor: Colin M. Sayers, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 510 days.

(21) Appl. No.: 11/155,278

(22) Filed: Jun. 17, 2005

(65) Prior Publication Data

US 2006/0283589 A1    Dec. 21, 2006

(51) Int. Cl.
*G01V 1/32* (2006.01)

(52) U.S. Cl. .......................... 367/38; 367/14; 367/47; 367/48

(58) Field of Classification Search .................. 367/14, 367/37, 38, 47, 48
See application file for complete search history.

(56) References Cited

U.S. PATENT DOCUMENTS 5,508,973 A    4/1996    Mallick et al.

OTHER PUBLICATIONS

Sayers, et al. "Azimuthal variation in AVO response for fractured gas sands." Geophysical Prospecting, vol. 45, 1997.*
Min, et al. "Numerical determination of the equivalent elastic compliance tensor for fractured rock masses using the distinct element method." International Journal of Rock Mechanics and Mining Sciences, 40 (2003).*
Sayers, et al. "Azimuth-dependent AVO in reservoirs containing non-orthogonal fracture sets." Geophyscial Prospecting, 2001.*
Lynn et al., "Natural Fracture Characterization using P-wave Reflection Seismic Data," SPE 29595, pp. 493-506 (1995).
Sayers et al.,"A Simple Technique for Finding Effective Elastic Constants of Cracked Solids for Arbitrary Crack Orientation Statistics," Intl J. Solids and Structures, 27, pp. 671-680 (1991).
Sayers et al., "Microcrack-induced Elastic Wave Anisotropy of Brittle Rocks," J. Geophys. Res. B., 100, pp. 4149-4156 (1995).
Schoenberg et al., "Zoeppritz rationalized and Generalized to Anisotropy," J. Seismic Exploration, 1, pp. 125—144 (1992).

(Continued)

*Primary Examiner*—Scott A Hughes
(74) *Attorney, Agent, or Firm*—Osha Liang LLP

(57) ABSTRACT

A method of characterizing a fractured reservoir in a field includes measuring seismic reflection coefficient of the fractured reservoir as a function of angle of incidence and azimuth, predicting seismic reflection coefficient of the fractured reservoir as a function of angle of incidence and azimuth using an elastic stiffness tensor and an elastic compliance tensor of the fractured reservoir, determining components of an excess compliance tensor due to the presence of fractures in the fractured reservoir by matching the predicted seismic reflection coefficient to the measured seismic reflection coefficient, and characterizing one or more properties of the fractured reservoir using the excess compliance tensor.

17 Claims, 3 Drawing Sheets

OTHER PUBLICATIONS

Psencik et al., "Weak Contrast PP Wave Displacement R/T Coefficients in Weakly Anistotropic Elastic Media," Pure Applied Geophysics, 151, pp. 669-718 (1998).

Kachanov, "Continuum Model of Medium with Cracks," J. Eng'g Mech. Div., ASCE, 106 pp. 1039-1051 (1980).

Haugen, Geir U. et al., "The echo of a fault or fracture," Geophysics, Jan.-Feb. 2000, pp. 176-189, vol. 65, No. 1.

Schoenberg, Michael A. et al, "Azimuth-dependent tuning of seismic waves reflected from fractured reservoirs," Geophysics, Jul.-Aug. 1999, pp. 1160-1171, vol. 64, No. 4.

Sayers, Colin M., "Monitoring production-induced stress changes using seismic waves," SEG Int'l Exposition and 74th Annual Meeting, Oct. 10-15, 2004, Denver, Colorado.

* cited by examiner

METHOD OF CHARACTERIZING A FRACTURED RESERVOIR USING SEISMIC REFLECTION AMPLITUDES

BACKGROUND OF THE INVENTION

Characterization of fractured reservoirs plays an important role in optimizing production from fractured reservoirs. Such characterization may include, for example, determining variations in fracture density and permeability of the fracture network and determining orientation of fractures in the fracture network. Areas of high fracture density can represent "sweet spots" of high permeability and therefore can be targeted for placement of infill wells. Fractures with largest aperture at depth tend to be oriented along the direction of the maximum in-situ horizontal stress and may therefore lead to significant permeability in the reservoir, which would lead to permeability anisotropy. For optimum drainage it is important that infill wells are more closely spaced along the direction of minimum permeability than along the direction of maximum permeability. Fracture orientation is useful in determining trajectory of a deviated well. For maximum recovery, the trajectory of the well can be chosen such that as many fractures as possible are intersected.

It is known that oriented sets of fractures lead to direction-dependent seismic velocities. As a result, use of seismic waves to determine the orientation of fractures has received much attention. For example, Lynn et al. use the azimuthal variation in reflection amplitude of seismic P-waves to characterize naturally fractured gas reservoirs in the Bluebell Altamont Field in the Uinta Basin, Northeastern Utah. (Lynn, H. B. Bates, C. R., Layman, M., and Jones, M. "Natural fracture characterization using P-wave reflection seismic data, VSP, borehole imaging logs, and in-situ stress field determination," SPE 29595, (1995).) Reflection amplitudes offer advantages over seismic velocities for characterizing fractured reservoirs since they have higher vertical resolution and are more sensitive to the properties of the reservoir. However, interpretation of variations in reflection amplitude requires a model that allows the measured change in reflection amplitude to be inverted for the characteristics of the fractured reservoir.

Current models used to describe the seismic response of fractured reservoirs make simplified assumptions that prevent fractured reservoirs from being characterized correctly. For example, most models assume a single set of perfectly aligned fractures (see, e.g., U.S. Pat. No. 5,508,973 issued to Mallick et al.), while most reservoirs contain several fracture sets with variable orientations within a given fracture set. Use of a model of a fractured reservoir that assumes a single set of fractures in a reservoir containing several fracture sets can give misleading results. For example, consider a vertically fractured reservoir containing a large number of fractures with normals being isotropically distributed in the horizontal plane. For such a fractured reservoir there would be little or no variation in reflection coefficient with azimuth, and an interpretation of the reflection amplitude versus azimuth curve using an assumption of a single set of aligned fractures would predict incorrectly that the fracture density is zero.

From the foregoing, there continues to be a desire for an improved method of characterizing a fractured reservoir using seismic reflection amplitudes.

SUMMARY OF THE INVENTION

In one aspect, the invention relates to a method of characterizing a fractured reservoir in a field which comprises measuring seismic reflection coefficient of the fractured reservoir as a function of angle of incidence and azimuth, predicting seismic reflection coefficient of the fractured reservoir as a function of angle of incidence and azimuth using an elastic stiffness tensor and an elastic compliance tensor of the fractured reservoir, determining components of an excess compliance tensor due to the presence of fractures in the fractured reservoir by matching the predicted seismic reflection coefficient to the measured seismic reflection coefficient, and characterizing one or more properties of the fractured reservoir using the excess compliance tensor.

In another aspect, the invention relates to a method of placing infill wells in a field containing a fractured reservoir which comprises measuring seismic reflection coefficient of the fractured reservoir as a function of angle of incidence and azimuth, predicting seismic reflection coefficient of the fractured reservoir as a function of angle of incidence and azimuth using an elastic stiffness tensor and an elastic compliance tensor of the fractured reservoir, determining components of an excess compliance tensor due to the presence of fractures in the fractured reservoir by matching the predicted seismic reflection coefficient to the measured seismic reflection coefficient, using variation in excess compliance tensor across the fractured reservoir as an estimate of variation in fracture density across the fractured reservoir, and targeting areas having large fracture density for placement of the infill wells.

Other features and advantages of the invention will be apparent from the following description and the appended claims.

DETAILED DESCRIPTION OF THE INVENTION

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not obscure the invention. The features and advantages of the invention may be better understood with reference to the drawings and discussions that follow.

Figure 1:
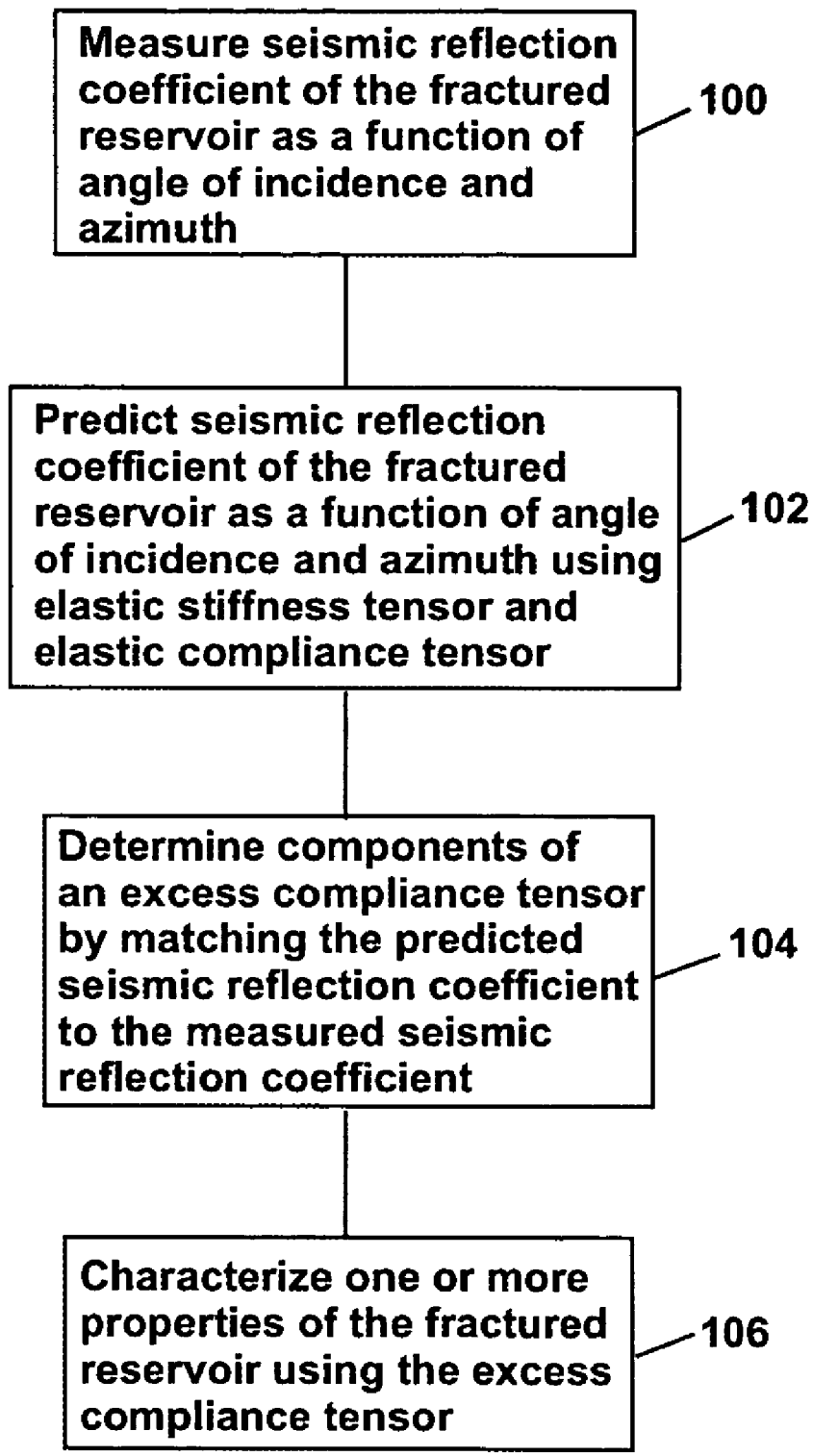
FIG. 1 is a flowchart illustrating a method of characterizing a fractured reservoir according to one embodiment of invention.

FIG. 1 is a flowchart illustrating a method of characterizing a fractured reservoir according to an embodiment of the invention. The method includes measuring seismic reflection coefficient of the fractured reservoir as a function of angle of incidence and azimuth (100). This involves acquiring seismic reflection data from the fractured reservoir and extracting reflection coefficient from the seismic reflection data. The method further includes predicting seismic reflection coefficient of the fractured reservoir as a function of incidence angle and azimuth from an elastic stiffness tensor and an elastic compliance tensor of the fractured reservoir (102). The method further includes determining components of an excess compliance tensor due to presence of fractures in the fractured reservoir by matching the measured seismic reflection coefficient to the predicted seismic reflection coefficient (104). The method further includes characterizing one or more properties of the fractured reservoir using the excess compliance tensor (106). Steps 100 through 106 will now be described in detail.

Figure 2:
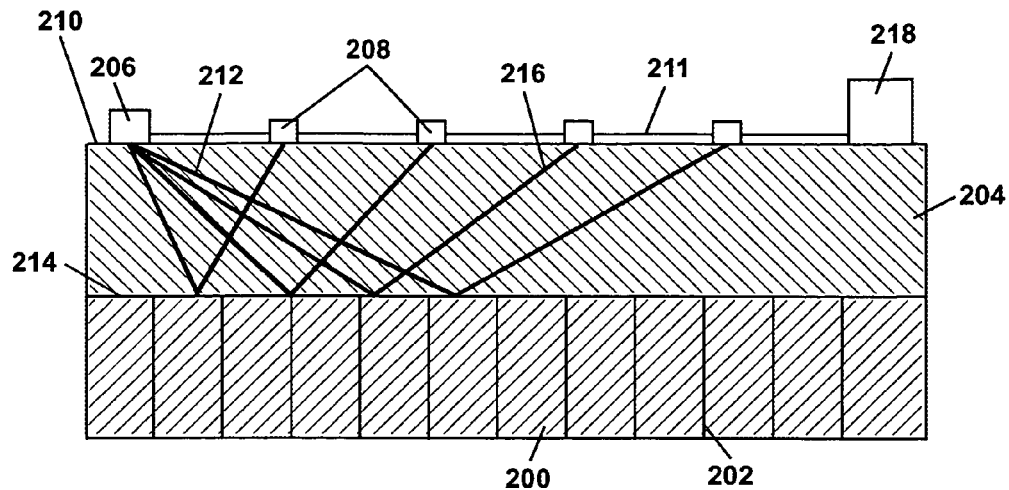
FIG. 2 illustrates a setup for measuring seismic reflection coefficient of a fractured reservoir.

FIG. 2 illustrates a setup for measuring seismic reflection coefficient of a fractured reservoir 200 as a function of angle of incidence and azimuth. In the illustrated example, the fractured reservoir 200 contains vertical fractures 202, and a formation 204 overlies the fractured reservoir 200. Seismic reflection data can be acquired from the fractured reservoir 200 using a controlled seismic source 206 and a plurality of seismic receivers 208 located on the earth surface 210 along a line of survey 211 having a known azimuth. The seismic source 206 may generate compressional waves (P-waves) or shear waves (S-waves), and the seismic receivers 208 may respond to P-waves or S-waves.

Seismic waves 212 generated by the seismic source 206 propagate to the fractured reservoir 200 and are reflected back to the earth surface 210 from the interface 214 between the formation 204 and the fractured reservoir 200. Seismic reflections from the base of the fractured reservoir 200 may also be used in a similar way. The seismic receivers 208 detect the reflected waves 216 and generate electrical signals in response. These electrical signals are recorded by a seismograph 218 and subsequently processed into seismic traces, which contain information about seismic reflection amplitudes. Seismic reflection data is preferably collected for multiple lines of surveys having different known azimuths so that variations in reflection amplitudes as a function of incidence angle and azimuth can be determined. Reflection coefficient is the ratio of the amplitude of the reflected wave to the incident wave, and may be determined from the seismic reflection data using standard methods.

Figure 3A:
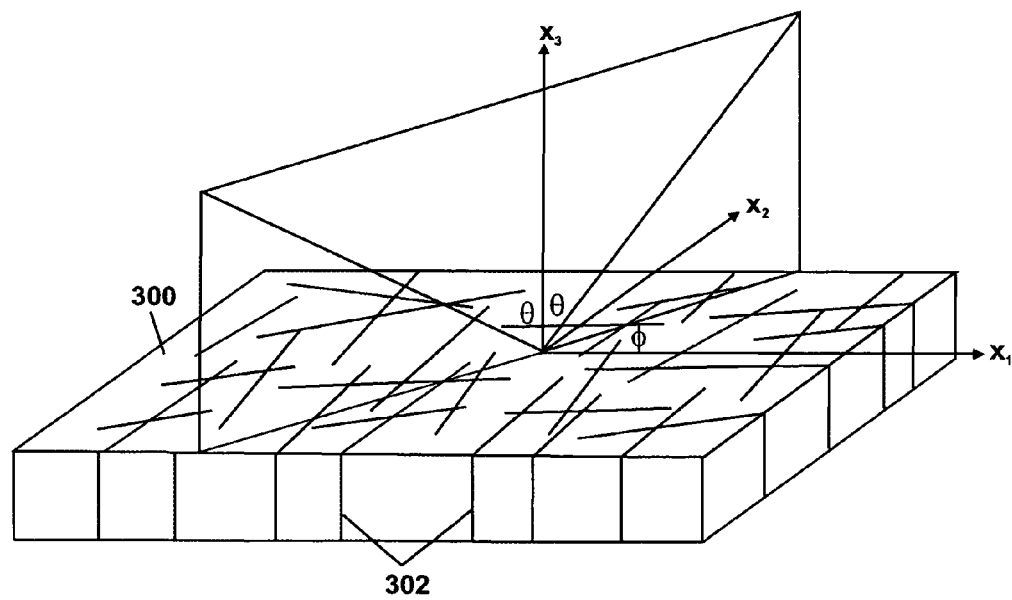
FIG. 3A is a schematic of the reflection of seismic waves from a fractured reservoir.

FIG. 3A shows a three-dimensional model of a fractured layer 300 having vertical fractures 302 with variable orientations. The axes $x_1$, $x_2$, and $x_3$ are chosen with $x_3$ normal to the fractured layer 300. Consider the reflection of seismic P-waves with angle of incidence $\theta$ and azimuth $\phi$ from the fractured layer 300. (It should be noted that the analysis presented herein also may be applied to S-wave reflections or P-wave to S-wave reflections instead of P-wave reflections.) At the reflection point, the fractured layer 300 can be treated as an effective medium having elastic compliance tensor, $s_{ijkl}$, and elastic stiffness tensor, $c_{ijkl}$. These tensors will vary laterally over the fractured layer 300 due to a lateral variation in fracture density.

According to Sayers and Kachanov, the elastic compliance tensor, $s_{ijkl}$, of a fractured reservoir can be written in the form:

$$s_{ijkl} = s_{ijkl}^0 + \Delta s_{ijkl} \qquad (1)$$

where $s_{ijkl}^0$ is the elastic compliance tensor of the reservoir in the absence of fractures and $\Delta s_{ijkl}$ is the excess compliance tensor due to the presence of the fractures. (Sayers, C. M. and Kachanov M. (1991) A simple technique for finding effective elastic constants of cracked solids for arbitrary crack orientation statistics. *Int. J. Solids and Structures*, 27, 671-680. Sayers, C. M. and Kachanov, M. (1995) Microcrack-induced elastic wave anisotropy of brittle rocks. *J. Geophys. Res. B*, 100, 4149-4156.)

Figure 3B:
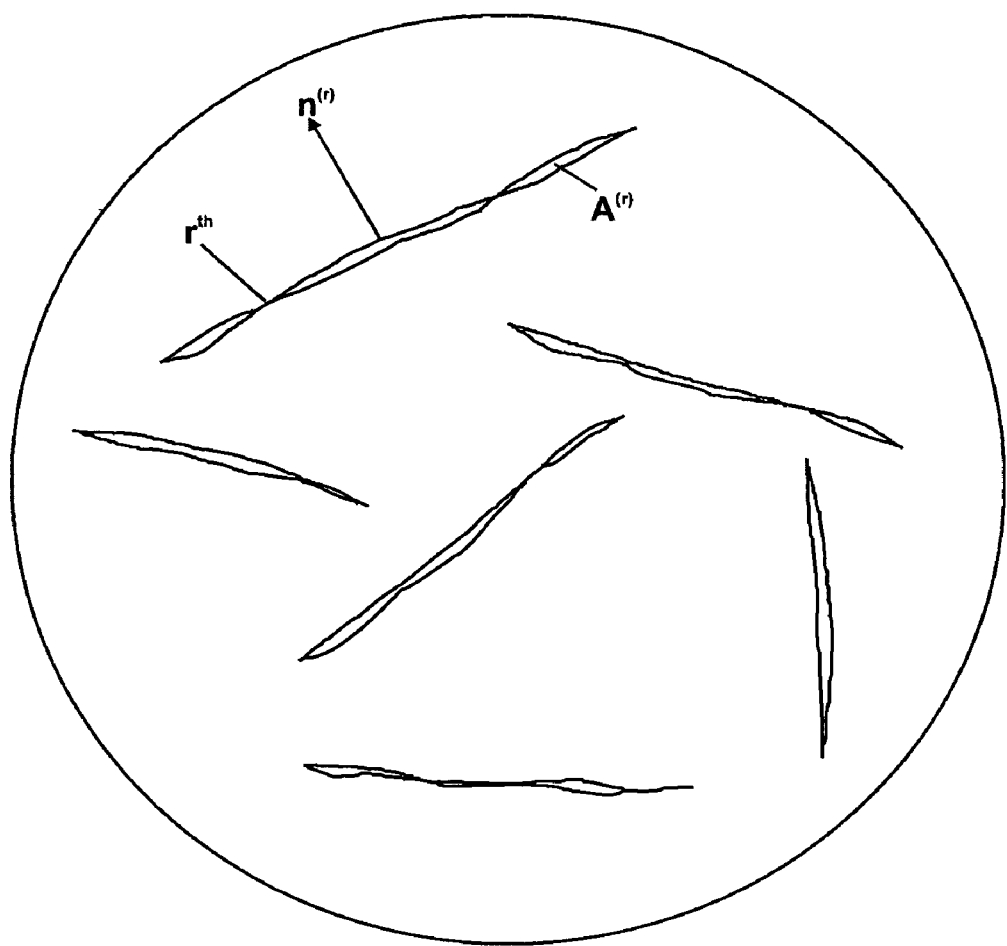
FIG. 3B illustrates an $r^{th}$ fracture having normal $n^{(r)}$ and area $A^{(r)}$ in a volume of a fractured reservoir.

The excess compliance tensor due to presence of fractures, $\Delta s_{ijkl}$, can be written as:

$$\Delta s_{ijkl} = \frac{1}{4}(\delta_{ik}\alpha_{jl} + \delta_{il}\alpha_{jk} + \delta_{jk}\alpha_{il} + \delta_{jl}\alpha_{ik}) + \beta_{ijkl} \qquad (2)$$

where $\alpha_{ij}$ is a second-rank fracture compliance tensor and $\beta_{ijkl}$ is a fourth-rank fracture compliance tensor defined by:

$$\alpha_{ij} = \frac{1}{V}\sum_r B_T^{(r)} n_i^{(r)} n_j^{(r)} A^{(r)} \qquad (3)$$

$$\beta_{ij} = \frac{1}{V}\sum (B_N^{(r)} - B_T^{(r)}) \cdot n_i^{(r)} n_j^{(r)} n_k^{(r)} n_l^{(r)} A^{(r)} \qquad (4)$$

where $B_N^{(r)}$ and $B_T^{(r)}$ are the normal and shear compliance of the $r^{th}$ fracture in volume V, $n_i^{(r)}$ is the $i^{th}$ component of the normal to the fracture, and $A^{(r)}$ is the area of the fracture, as illustrated in FIG. 3B. The tangential compliance $B_T$ is assumed to be independent of the direction of the shear traction that occurs within the plane of the contact. From equations (3) and (4), $\alpha_{ij}$ and $\beta_{ijkl}$ are symmetric with respect to all rearrangements of the indices so that $\beta_{1122}=\beta_{1212}$, $\beta_{1133}=\beta_{1313}$, and so forth.

Assume that in the absence of fractures the reservoir is isotropic. For vertical fractures the elastic symmetry of the fractured reservoir is then monoclinic, with the non-vanishing elastic stiffness coefficients $c_{11}, c_{22}, c_{33}, c_{12}=c_{21}, c_{13}=c_{31}, c_{23}=c_{32}, c_{44}, c_{55}, c_{66}, c_{16}=c_{61}, c_{26}=c_{62}, c_{36}=c_{63}$, and $c_{45}=c_{54}$ in the conventional two-index notation. For vertical fractures with normals in the $x_1 x_2$ plane, the non-vanishing components of the excess compliance tensor, $\Delta s_{ijkl}$, due to the presence of the fractures are, in the conventional 2-index notation:

$$\Delta s_{11} = \alpha_{11} + \beta_{1111} \qquad (5a)$$

$$\Delta s_{22} = \alpha_{22} + \beta_{2222} \qquad (5b)$$

$$\Delta s_{12} = \Delta s_{21} = \beta_{1122} \qquad (5c)$$

$$\Delta s_{44} = \alpha_{22} \qquad (5d)$$

$$\Delta s_{55} = \alpha_{11} \qquad (5e)$$

$$\Delta s_{66} = (\alpha_{11} + \alpha_{12}) + 4\beta_{1122} \qquad (5f)$$

The elastic stiffness tensor, $c_{ijkl}$, of the fractured medium can be determined by inverting the elastic compliance tensor, $s_{ijkl}$, given by equation (1). This then allows the reflection coefficient to be computed for arbitrary fracture density and contrast across the interface using, for example, the method of Schoenberg and Protazio, or any other solution of the forward problem. (Schoenberg, M. and Protazio, J. (1992) Zoeppritz rationalized and generalized to anisotropy. *J. of Seismic Exploration*, 1, 125-144.).

Computation of reflection coefficient requires a knowledge of $\alpha_{11}$, $\alpha_{12}$, $\alpha_{22}$, $\beta_{1111}$, $\beta_{1112}$, $\beta_{1122}$, $\beta_{1222}$, and $\beta_{2222}$. However, if the normal and shear compliance of the discontinuities (fractures) are equal, it follows from equation (4) that the fourth-rank fracture compliance tensor $\beta_{ijkl}$ vanishes and the excess compliance tensor due to presence of fractures, $\Delta s_{ijkl}$, is completely determined by the second-rank fracture compliance tensor, $\alpha_{ij}$. This is a good approximation for sandstones. With this simplification, measurements of the reflection coefficient at various offsets and azimuths can be used to determine $\alpha_{11}$, $\alpha_{12}$, and $\alpha_{22}$ by varying these quantities numerically to minimize an objective function such as $\chi^2$ defined as the sum of the normalized residuals between the values derived from seismic measurement and those predicted by theory for a given choice of $\alpha_{11}$, $\alpha_{12}$, and $\alpha_{22}$:

$$\chi^2 = \sum_{i=1}^{N} \left( \frac{R_{PP}^{pred}(\theta_i, \phi_i) - R_{PP}^{meas}(\theta_i, \phi_i)}{\sigma_i} \right) \tag{6}$$

where $R_{PP}^{pred}(\theta_i, \phi_i)$ and $R_{PP}^{meas}(\theta_i, \phi_i)$ are the predicted and measured PP-reflection coefficient at an angle of incidence $\theta_i$ and azimuth $\phi_i$, $\sigma_i$ is the estimated error for measurement i, and N is the total number of $\theta, \phi$ pairs for which estimates of the reflection coefficient have been made. Alternatively, an $l_p$-norm may be minimized as defined by:

$$l_p\text{-}norm = \sum_{i=1}^{N} \left| \frac{R_{PP}^{pred}(\theta_i, \phi_i) - R_{PP}^{meas}(\theta_i, \phi_i)}{\sigma_i} \right| \tag{7}$$

For example, the norm of $l_1$ with p=1 could be used.

Since the number of unknowns ($\alpha_{11}$, $\alpha_{12}$, and $\alpha_{22}$) is relatively small, the minimum of equation (6) or (7) can be found by evaluating the functions on a regular grid of points in a coordinate system with axes $\alpha_{11}$, $\alpha_{12}$, and $\alpha_{22}$. Alternatively, one of the more efficient numerical methods described by Press et al. may be used for this purpose. (Press, W. H., Teukolsky, S. A., Vetterling, W. T. and Flannery, B. P. (1992) Numerical Recipes in Fortran: Cambridge University Press, Cambridge, UK.) To perform this inversion, it is necessary to know the properties, i.e., elastic moduli and density, of the reservoir and the overlying layer in the absence of fractures in the reservoir. These properties can be determined either by using measurements of reflection coefficient as a function of incidence angle and azimuth at a location where the fracture density is known to be small or by using sonic and density logs at a well within the field to determine the properties of the rock matrix.

In most cases, the anisotropy and contrast between the overlying layer and reservoir can be assumed to be small. If this is the case, the P-wave reflection coefficient for arbitrary elastic symmetry can be written in the form: (Psencik, I. and Vavrycuk, V. (1998) Weak Contrast PP wave displacement R/T coefficients in weakly anisotropic elastic media, Pure appl. geophys, 151, 669-718):

$$R_{PP}(\theta, \phi) = R_{PP}^{iso}(\theta) + \frac{1}{2}\left[\Delta\delta_x \cos^2\phi + \left(\Delta\delta_y - 8\frac{\beta^2}{\alpha^2}\Delta\gamma\right)\sin^2\phi + 2\left(\Delta\chi_z - 4\frac{\beta^2}{\alpha^2}\Delta\left(\frac{c_{45}}{c_{55}}\right)\right)\cos\phi\sin\phi\right]\sin^2\theta + \frac{1}{2}[\Delta\varepsilon_x \cos^4\phi + \Delta\varepsilon_y \sin^4\phi + \Delta\delta_z \cos^2\phi\sin^2\phi + 2(\Delta\varepsilon_{16}\cos^2\phi + \Delta\varepsilon_{26}\cos^2\phi)\cos\phi\sin\phi]\sin^2\theta\tan^2\theta \tag{8}$$

where $R_{PP}^{iso}(\theta)$ denotes the weak contrast reflection coefficient at an interface separating two slightly different isotropic media, and the anisotropy parameters are given by:

$$\delta_x = \frac{c_{13} + 2c_{55} - c_{33}}{c_{33}} \tag{9a}$$

$$\delta_y = \frac{c_{23} + 2c_{44} - c_{33}}{c_{33}} \tag{9b}$$

$$\delta_z = \frac{c_{12} + 2c_{66} - c_{33}}{c_{33}} \tag{9c}$$

$$\gamma = \frac{c_{44} - c_{55}}{2c_{55}} \tag{9d}$$

$$\chi_z = \frac{c_{36} + 2c_{45}}{c_{33}} \tag{9e}$$

$$\varepsilon_x = \frac{c_{11} - c_{33}}{2c_{33}} \tag{9f}$$

$$\varepsilon_y = \frac{c_{22} - c_{33}}{2c_{33}} \tag{9g}$$

$$\varepsilon_{16} = \frac{c_{16}}{c_{33}} \tag{9h}$$

$$\varepsilon_{26} = \frac{c_{26}}{c_{33}} \tag{9i}$$

The elastic stiffness tensor, c, can be found by inverting the elastic compliance tensor, s, given by equations (1) to (4). For small anisotropy, the elastic stiffness tensor, c, of the fractured medium can be written in terms of the elastic stiffness of the isotropic reservoir rock, $c^{(0)}$, and the excess compliance tensor due to the presence of fractures, $\Delta s$, as follows:

$$c = c^{(0)} = c^{(0)} \Delta s c^{(0)} \tag{10}$$

Neglecting the contribution of the fourth-rank fracture compliance tensor, the anisotropy parameters are found to be given by:

$$\varepsilon_x = \delta_x = \frac{2\mu(\lambda + \mu)}{(\lambda + 2\mu)}\alpha_{11} \tag{11a}$$

$$\varepsilon_y = \delta_y = \frac{2\mu(\lambda + \mu)}{(\lambda + 2\mu)}\alpha_{22} \tag{11b}$$

$$\delta_z = \frac{2\mu(\lambda + \mu)}{(\lambda + 2\mu)}\alpha_{11} + \alpha_{22} \tag{11c}$$

$$\gamma = \frac{\mu(\alpha_{22} - \alpha_{11})}{2} \tag{11d}$$

$$\varepsilon_{16} = \varepsilon_{26} = \chi_z = \frac{2\mu(\lambda + \mu)}{(\lambda + 2\mu)}\alpha_{12} \tag{11e}$$

$$\frac{c_{45}}{c_{55}} = \mu\alpha_{12} \tag{11f}$$

where $\lambda$ and $\mu$ are the second-order elastic constants of the reservoir rock in the absence of fractures.

Substitution of equations (8) to (11f) into equations (6) or (7) allows $\alpha_{11}$, $\alpha_{12}$, and $\alpha_{22}$ to be determined using a minimization of the appropriate norm involving the difference between the measured and predicted reflection coefficient as a function of the angle of incidence and azimuth. As before, it is necessary to know the properties of the reservoir and overlying layer in the absence of fractures in the reservoir. These can be determined by using measurements of reflection coefficient as a function of incidence angle and azimuth at a location where the fracture density is known to be small or by using sonic or density logs at a well within the field to determine the properties of the rock matrix, and then scaling up the results to seismic wavelengths.

In one embodiment, the excess compliance tensor is completely determined by the second-rank fracture compliance tensor. For vertical fractures, the second-rank fracture compliance tensor, $\alpha_{ij}$, has the form:

$$\alpha_{ij} = \begin{bmatrix} \alpha_{11} & \alpha_{12} & 0 \\ \alpha_{12} & \alpha_{22} & 0 \\ 0 & 0 & \alpha_{33} \end{bmatrix} \quad (12)$$

In one embodiment, the components of the second-rank fracture compliance tensor at a point in a fractured reservoir are directly proportional to fracture density. A fractured reservoir may be divided into a grid of points, and a map of the second-rank fracture compliance tensor may be generated for each point in the grid. The sections of the map where the components of the second-rank fracture compliance tensor are largest indicate the areas of high fracture density in the fractured reservoir. These high fracture density areas can indicate "sweet spots" of high permeability. The method of the invention includes targeting these high fracture density areas for drilling of infill wells.

In one embodiment, the second-rank fracture compliance tensor, $\alpha_{ij}$, is diagonalized by rotating through an angle $\phi_0$ about axis $x_3$ (normal to the fractured layer). The angle $\phi_0$ can be expressed in terms of the components of the second-rank fracture compliance tensor as follows:

$$\tan 2\phi_0 = \frac{2\alpha_{12}}{(\alpha_{11} - \alpha_{22})} \quad (13)$$

It should be noted that the angle $\phi_0$ may also be determined from the polarization of the fast shear wave measured with three orthogonal seismic receivers in a well. Therefore, borehole seismic information may be used to help in the inversion of reflection coefficients for $\alpha_{11}$, $\alpha_{12}$, and $\alpha_{22}$, particularly in cases of poor quality data. Since $\phi_0$ is determined by the most compliant fractures, it can provide a useful estimate of the orientation of the fractures and the direction of maximum permeability. A map of angle $\phi_0$ may be generated for the fractured reservoir using a map of the second-rank fracture compliance tensor for the fractured reservoir. The method includes using the map of angle $\phi_0$ to determine the optimum trajectory of deviated wells designed to intersect as many open fractures as possible and to determine the relative orientation of neighboring infill wells such that drainage is optimized. In a preferred embodiment, wells are more closely spaced along the direction of minimum permeability than along the direction of maximum permeability.

In another embodiment, the second-rank fracture compliance tensor, $\alpha_{ij}$, is used to estimate additional permeability resulting from fractures in the fractured reservoir. This requires a knowledge of the permeability of the rock matrix, as can be determined from measurements on cores, and estimates of the permeability tensor from well tests or from reservoir history matching. In many cases, the permeability anisotropy is unknown and only an estimate of the trace of the permeability tensor, $k_{ij}$, is available. A cross-plot of the trace of $\alpha_{ij}$ against the trace of $k_{ij}$ or against an estimate of the permeability from reservoir history matching or from well tests allows a linear relation to be derived that may be used to predict permeability everywhere in the reservoir using $\alpha_{ij}$ determined from an inversion of the seismic reflection amplitudes. If the anisotropy of the permeability tensor, $k_{ij}$, at one or more well locations is known from well tests or reservoir history matching, a similar relation between the components of $k_{ij}$ and the components of $\alpha_{ij}$ can be used to predict the permeability anisotropy away from the locations used for calibration.

In another embodiment, the second-rank fracture compliance tensor, $\alpha_{ij}$, is used to estimate permeability in the fractured reservoir. For this embodiment, a second-rank hydraulic tensor $\gamma_{ij}$ can be defined as:

$$\gamma_{ij} = \frac{1}{V} \sum_r g^{(r)} n_i^{(r)} n_j^{(r)} A^{(r)} \quad (14)$$

where $g^{(r)}$ is the hydraulic conductivity of the $r^{th}$ fracture in volume V and $A^{(r)}$ is the area of the fracture. The permeability tensor in the presence of fractures can be written as:

$$k = k(\gamma) \quad (15)$$

If $k_0$ is the permeability tensor in the absence of fractures, the contribution of fractures to the permeability is given by $k-k_0$.

If in the absence of fractures the permeability of the reservoir rock can be assumed to the isotropic, with $$k_0 = k_0 I \quad (16)$$

I being the unit tensor and $k(\gamma)$ being an isotropic function, that is, if both the gradient in pressure and the fractures undergo any orthogonal transformation then the flow undergoes the same orthogonal transformation. The Cayley-Hamilton theorem then implies that $k-k_0 I$ is a polynomial quadratic in $\gamma_{ij}$ with coefficients that are functions of the invariants of $\gamma_{ij}$. (Kachanov, M. (1980) Continuum model of medium with cracks. *J. Engng. Mech. Div. ASCE*, 106, 1039-1051.) Linearizing in $\gamma_{ij}$ and using the fact that a set of parallel fractures does not affect the flow perpendicular to the fractures allows $k-k_0 I$ to be determined as a function of $\gamma_{ij}$:

$$k-k_0 I = C[tr(\gamma)I - \gamma] \quad (17)$$

This allows $\gamma$ to be determined in the vicinity of well locations given estimates of the permeability tensor k obtained from well tests or from reservoir history matching and a knowledge of the permeability tensor $k_0$ of the rock matrix, as can be determined from measurements on cores.

A cross-plot of the components of $\gamma_{ij}$ versus the components of $\alpha_{ij}$, or a cross-plot of a trace of $\gamma_{ij}$ versus the trace of $\alpha_{ij}$ allows a relation of proportionality between $\gamma_{ij}$ and $\alpha_{ij}$ to be determined that can be used to predict permeability using values of $\alpha_{ij}$ determined from the inversion of seismic reflection amplitude away from the locations used for the calibration. It should be noted by comparing equations (3) and (14) that $\gamma_{ij}$ will be exactly proportional to $\alpha_{ij}$ if either the properties of all fractures are equal or if there is a single dominant set of aligned fractures. The latter may occur in the presence of multiple sets of fractures if there is significant in-situ stress anisotropy, in which case only the fractures with normals parallel to the minimum compressive stress are expected to have a significant effect on elastic wave propagation and fluid flow. In other cases, the proportionality between $\gamma_{ij}$ and $\alpha_{ij}$ will not be exact, but is expected to lead to a useful prediction of high fracture density and, hence, higher permeability.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of characterizing a fractured reservoir in a field, comprising:

measuring, using a controlled seismic source and a plurality of seismic receivers, seismic reflection coefficient of the fractured reservoir as a function of angle of incidence and azimuth to obtain a measured seismic reflection coefficient;

predicting the seismic reflection coefficient of the fractured reservoir as a function of angle of incidence and azimuth using an elastic stiffness tensor and an elastic compliance tensor of the fractured reservoir to obtain a predicted seismic reflection coefficient;

representing a plurality of anisotropy parameters as functions of components of an excess compliance tensor, wherein the plurality of anisotropy parameters are associated with the elastic stiffness tensor, wherein the excess compliance tensor is comprised in the elastic compliance tensor due to the presence of differently oriented fractures in the fractured reservoir;

determining the components of the excess compliance tensor by matching the predicted seismic reflection coefficient to the measured seismic reflection coefficient;

characterizing one or more properties of the fractured reservoir using the excess compliance tensor;

determining a placement for an infill well in the field containing the fractured reservoir based on the characterization of the one or more properties of the fractured reservoir.

2. The method of claim 1, wherein measuring seismic reflection coefficient comprises transmitting a seismic wave to the fractured reservoir and receiving reflections of the seismic wave from at least one selected from a group consisting of a top and a bottom of the fractured reservoir at a plurality of locations at a surface of the field having known azimuth.

3. The method of claim 1, wherein predicting seismic reflection coefficient comprises providing the seismic reflection coefficient in linearized form.

4. The method of claim 1, wherein matching the predicted seismic reflection coefficient to the measured seismic reflection coefficient comprises determining properties of the reservoir and a formation overlying the reservoir in the absence of fractures.

5. The method of claim 1, wherein the excess compliance tensor comprises a second-rank fracture compliance tensor defined by $$\alpha_{ij} = \frac{1}{V} \sum_r B_T^{(r)} n_i^{(r)} n_j^{(r)} A^{(r)}$$

where $B_T^{(r)}$ is the shear compliance of the $r^{th}$ fracture in volume V of the fractured reservoir, $n_i^{(r)}$ is the $i^{th}$ component of the normal to the $r^{th}$ fracture, and $A^{(r)}$ is the area of the $r^{th}$ fracture.

6. The method of claim 5, wherein the excess compliance tensor further comprises a fourth-rank fracture compliance tensor defined by $$\beta_{ij} = \frac{1}{V} \sum (B_N^{(r)} - B_T^{(r)}) \cdot n_i^{(r)} n_j^{(r)} n_k^{(r)} n_l^{(r)} A^{(r)}$$

where $B_N^{(r)}$ and $B_T^{(r)}$ are the normal and shear compliance of the $r^{th}$ fracture in volume V of the fractured reservoir, $n_i^{(r)}$ is the $i^{th}$ component of the normal to the $r^{th}$ fracture, and $A^{(r)}$ is the area of the $r^{th}$ fracture.

7. The method of claim 5, wherein determining components of the excess compliance tensor comprises determining components of the second-rank fracture compliance tensor.

8. The method of claim 1, wherein components of the excess compliance tensor are determined at a plurality of points in the fractured reservoir.

9. The method of claim 8, further comprising using variation in the excess compliance tensor across the plurality of points as an estimate of variation in fracture density over the fractured reservoir.

10. The method of claim 5, wherein characterizing one or more properties of the fractured reservoir comprises diagonalizing the second-rank fracture compliance tensor by rotating through an angle about a normal to the fractured reservoir.

11. The method of claim 10, further comprising using the angle of rotation as an estimate of orientation of fractures in the fractured reservoir.

12. The method of claim 5, wherein characterizing one or more properties of the fractured reservoir comprises generating a cross-plot of the second-rank fracture compliance tensor and a permeability tensor at a known location in the fractured reservoir and using the cross-plot to predict permeability anisotropy away from the known location.

13. The method of claim 5, wherein characterizing one or more properties of the fractured reservoir comprises generating a cross-plot of a trace of the second-rank fracture compliance tensor and a trace of a permeability tensor at a known location in the fractured reservoir and using the cross-plot to predict permeability across the fractured reservoir.

14. The method of claim 5, wherein characterizing one or more properties of the fractured reservoir comprises predicting permeability of the fractured reservoir as a function of a second-rank hydraulic tensor defined by $$\gamma_{ij} = \frac{1}{V} \sum_r g^{(r)} n_i^{(r)} n_j^{(r)} A^{(r)}$$

where $g^{(r)}$ is the hydraulic conductivity of the $r^{th}$ fracture in volume V and $A^{(r)}$ is the area of the fracture.

15. The method of claim 14, further comprising determining components of the second-rank hydraulic tensor from estimates of permeability at a known location in the fractured reservoir.

16. The method of claim 15, wherein the estimates of permeability are obtained from at least one selected from a group consisting of well tests and reservoir history matching.

17. The method of claim 15, further comprising generating a cross-plot of the second-rank hydraulic tensor and the second-rank fracture compliance tensor and using the cross-plot to predict permeability away from the known location.

* * * * *